US008696435B2

(12) United States Patent
Graham

(10) Patent No.: US 8,696,435 B2
(45) Date of Patent: Apr. 15, 2014

(54) GAMING SYSTEM AND A METHOD OF GAMING

(75) Inventor: Philippa Alice Graham, Beacon Hill (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 727 days.

(21) Appl. No.: 12/357,087

(22) Filed: Jan. 21, 2009

(65) Prior Publication Data

US 2009/0239635 A1 Sep. 24, 2009

(30) Foreign Application Priority Data

Jan. 21, 2008 (AU) ................................ 2008900265

(51) Int. Cl.
*A63F 13/10* (2006.01)
*G06F 19/00* (2011.01)

(52) U.S. Cl.
USPC ........................................................... 463/20

(58) Field of Classification Search
USPC ..................................................... 463/16–21
See application file for complete search history.

(56) References Cited

U.S. PATENT DOCUMENTS 7,771,266 B2 * 8/2010 Gerrard et al. .................. 463/20
7,980,943 B2 * 7/2011 McGlone et al. ............... 463/19
2002/0065126 A1 5/2002 Miller et al.
2003/0195034 A1 10/2003 Dunaevsky
2004/0002372 A1 1/2004 Rodgers et al.
2004/0053660 A1 3/2004 Webb et al.
2005/0059460 A1 * 3/2005 Breen et al. ..................... 463/16
2005/0070353 A1 3/2005 Webb et al.
2006/0025201 A1 * 2/2006 Van Asdale ..................... 463/20
2006/0030399 A1 * 2/2006 Baerlocher ..................... 463/20

FOREIGN PATENT DOCUMENTS

WO WO2006029446 * 3/2006 ................ A63F 5/04

* cited by examiner

*Primary Examiner* — Julio J Maldonado
*Assistant Examiner* — Daniel Shook
(74) *Attorney, Agent, or Firm* — Hanley, Flight and Zimmerman, LLC

(57) ABSTRACT

Gaming system(s) and/or method(s) are provided to implement a game including a first game and a second game. A gaming system includes a game controller arranged to control operation of a first game and a second game, and a display arranged to display representations of play of the second game. The representations include a selector having a plurality of outcome indicating parts and an indicator. The game controller is arranged to determine a second game outcome for the second game and control the indicator to indicate the outcome indicating part associated with the second game outcome. The second game outcome is dependent on operation of the first game.

43 Claims, 7 Drawing Sheets

GAMING SYSTEM AND A METHOD OF GAMING

CROSS-REFERENCE TO RELATED APPLICATIONS

The present application claims the benefit of priority to Australian Provisional Patent Application No. 2008900265, filed on Jan. 21, 2008, entitled "GAMING SYSTEM AND METHOD OF GAMING", which is herein incorporated by reference in its entirety.

FIELD OF THE INVENTION

The present invention relates to a gaming system and to a method of gaming, and, particularly, but not exclusively, to a method and system of gaming that includes a wheel game.

BACKGROUND OF THE INVENTION

Games comprising a wheel or representation of a wheel and an indicator which moves relative to the wheel are known. These "wheel games" may be implemented as mechanical wheels, electro-mechanical wheels or generated by electronic displays such as video displays. Each wheel usually comprises a number of segments, each segment representing a particular game outcome.

Gaming systems are known which utilise wheel games as secondary or "feature" games in addition to a "base" game played by the gaming system.

It is also known to provide a gaming system which comprises a game controller which is arranged to randomly display several symbols from a pre-determined set of symbols and to determine a game outcome such as a game win based on the displayed symbols. Such gaming systems may commonly be implemented as a stepping machine provided with reels with each reel carrying several symbols of the set, or a video machine where the selected symbols are displayed as virtual reels on a graphical display device. Outcomes can occur based on symbols appearing on one or more horizontal lines, diagonal lines, or in any other pre-determined way It is known in gaming systems to provide reel games as a base game and a wheel game as a feature game generated as an outcome of the base reel game e.g. a particular symbol or symbol selection occurring in the base game may result in generation of a feature game played as a wheel game.

A problem with wheel games is that gaming regulations for some markets, including most Australian markets, require that the odds for wheel games must reflect the odds that a person would expect from viewing the wheel. For example, a wheel with six segments would generally be expected to carry odds of 6:1 for selection of a particular segment. This makes it more difficult to offer large prizes on a wheel because the larger the prize, the more effect it will have on the overall return to the player of the game. To support a large prize, either the chances of the player actually activating the wheel feature have to be very low or the amount of the average wager of the player needs to be high.

SUMMARY OF THE INVENTION

In accordance with a first aspect, the present invention provides a gaming system, including a game controller arranged to control operation of a first game and a second game, and a display arranged to display representations of play of the second game, the representations including a selector having a plurality of outcome indicating parts and an indicator, the game controller being arranged to determine a second game outcome for the second game and control the indicator to indicate the outcome indicating part associated with the second game outcome, the second game outcome being dependent on operation of the first game.

In an embodiment, the probability of a particular second game outcome occurring is dependent on operation of the first game.

In an embodiment, the game controller is arranged to determine a first game outcome for the first game, the second game outcome being dependent on the first game outcome.

In an embodiment, the second game is a wheel game. In this embodiment the plurality of outcome indicating parts are represented as segments of a wheel. An advantage of at least this embodiment is that the probability of stopping on each segment is not related to the size of that segment relative to the wheel. The probability of stopping on the segment is determined by operation of the first game. It may be possible, therefore, to award larger prizes for the second game outcome than would usually be the case if the wheel game was played as a separate game. In an embodiment, an outcome of the wheel game may be a jackpot prize.

In an embodiment, the game controller is arranged to control the display such that the indicator and outcome indicating parts move relative to each other, the motion being dependent on operation of the first game. The motion may occur as the first game is played. In an embodiment, the game controller includes a symbol selector arranged to select a plurality of symbols from a set of symbols for play of the first game. The outcome of the second game may depend on the symbol selection for the first game. In an embodiment, where the second game is a wheel game, the outcome indicating part (e.g. segment of wheel) depends on selection of a pre-determined symbol or symbols as an outcome of the first game. In an embodiment, each time a pre-determined symbol is selected during play of the first game, the game controller is arranged to control the display to move the indicator relative to the outcome indicating part, until the first game is complete. When the first game is complete, the outcome indicating part that is indicated represents the second game outcome. In this embodiment, the second game outcome depends on the number of the pre-determined symbols selected during the first game. In another embodiment, the outcome of the second game depends on a number of reel spins of one or more reels operating during the first game. In this embodiment, the game controller may include a symbol selector arranged to select a number of symbols from a set of symbols and control the display so that selected symbols appear in pre-determined positions on the reel or reels. A number of spins to complete the first game may include the number of spins required to select a pre-determined combination of symbols or number of pre-determined symbols to be displayed on the reels.

In an embodiment, the first game and second game may be generated as a feature game, generated in response to the outcome of a further game. The further game, may, for example, be a typical reel game where the game controller is arranged to randomly select and display several symbols from a pre-determined set of symbols and to determine a game outcome such as game win based on the selected symbols. In this embodiment, one game outcome is a win of a feature game, which results in the first game and second game being played.

In an embodiment, the first game and second game may be played for a jackpot win.

In accordance with a second aspect, the present invention provides a method of gaming, including the steps of playing a first game and a second game, displaying representations of play of the second game, the representations including a selector having a plurality of outcome indicating parts and an indicator, determining a second game outcome for the second game and controlling the indicator to indicate the outcome indicating part associated with the second game outcome, the second game outcome being dependent on play of the first game.

In accordance with a third aspect, the present invention provides a computer programme, including instructions for controlling a computer to implement a gaming system in accordance with the first aspect of the invention.

In accordance with a fourth aspect, the present prevention provides a computer readable medium providing computer programme in accordance with the third aspect of the invention.

In accordance with a fifth aspect, the present invention provides a data signal including a computer program in accordance with the third aspect of the invention.

In accordance with a sixth aspect, the present invention provides a game controller for a gaming system, the game controller being arranged to control operation of a first game and a second game, and control operation of a display to display representations of play of the second game, the representations including a selector having a plurality of outcome indicating parts and an indicator, the game controller being arranged to determine a second game outcome for the second game and control the indicator to indicate the outcome indicating part associated with the second game outcome, the second game outcome being dependent upon operation of the first game.

In accordance with a seventh aspect, the present invention provides a computer program, including instructions for controlling a computer to implement a game controller in accordance with the sixth aspect of the invention.

In accordance with an eighth aspect, the present invention provides a computer readable medium, providing a computer program in accordance with the seventh aspect of the invention.

In accordance with a ninth aspect, the present invention provides a data signal, including a computer program in accordance with the seventh aspect of the invention.

BRIEF DESCRIPTION OF THE DRAWINGS

Features and advantages of the present invention will become apparent from the following description of embodiments thereof, by way of example only, with reference to the accompanying drawings, in which.

Figure 1:
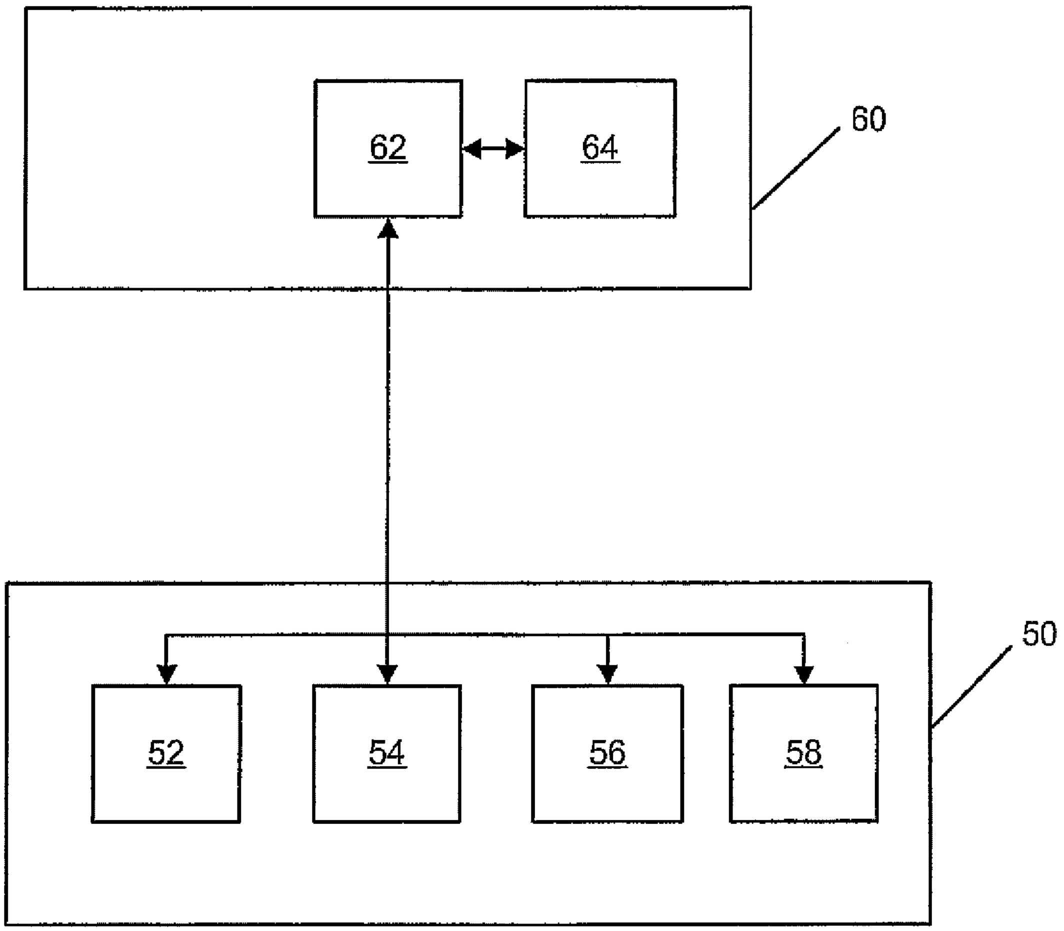
FIG. 1 is a schematic block diagram of core components of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF EMBODIMENT

Referring to the drawings, there are illustrated example embodiments of a gaming system which is arranged to implement a game including a first game and a second game. The gaming system includes a display arranged to display representations of play of the first and second games. In this example, the representations of the second game include a selector having a plurality of outcome indicating parts and an indicator for indicating one or more of the outcome indicating parts. In this example, the arrangement of the outcome indicating parts is in the form of segments of a wheel and the second game is played as a wheel game. A second game outcome for the second game is dependent on operation of the first game. In this embodiment, the first game is a reel game.

In this embodiment, the first game and second game are played as a “feature” of a further game or a “base” game.

Because the outcome of the second game depends on the operation of the first game, this enables the probability of a particular second game outcome to be determined by operation of the first game.

The gaming system of this embodiment of the invention can take a number of different forms.

In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
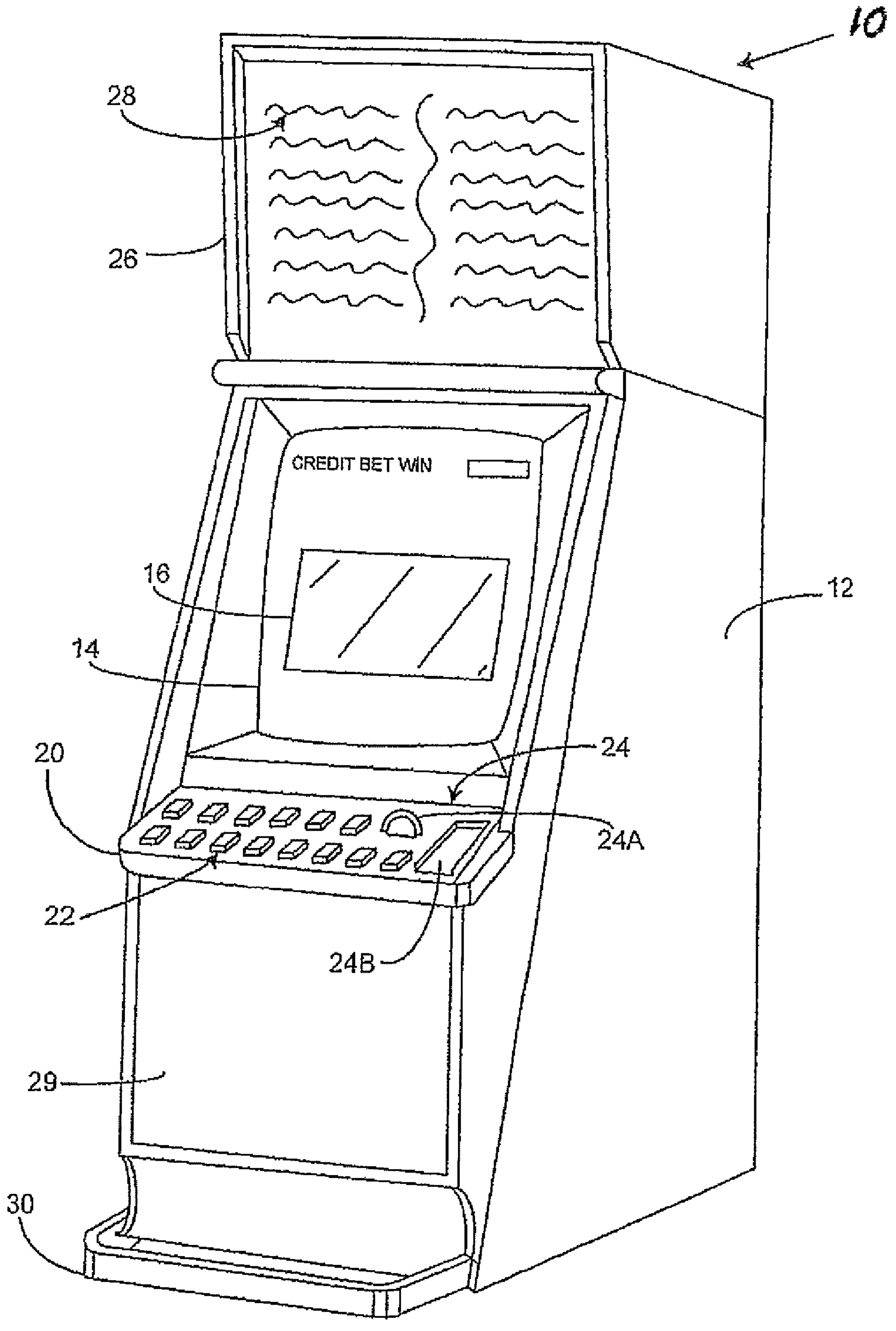
FIG. 2 is diagrammatic representation of a gaming system in accordance with an embodiment of the present invention with the gaming system implemented in the form of a stand alone gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during gameplay. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (now shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
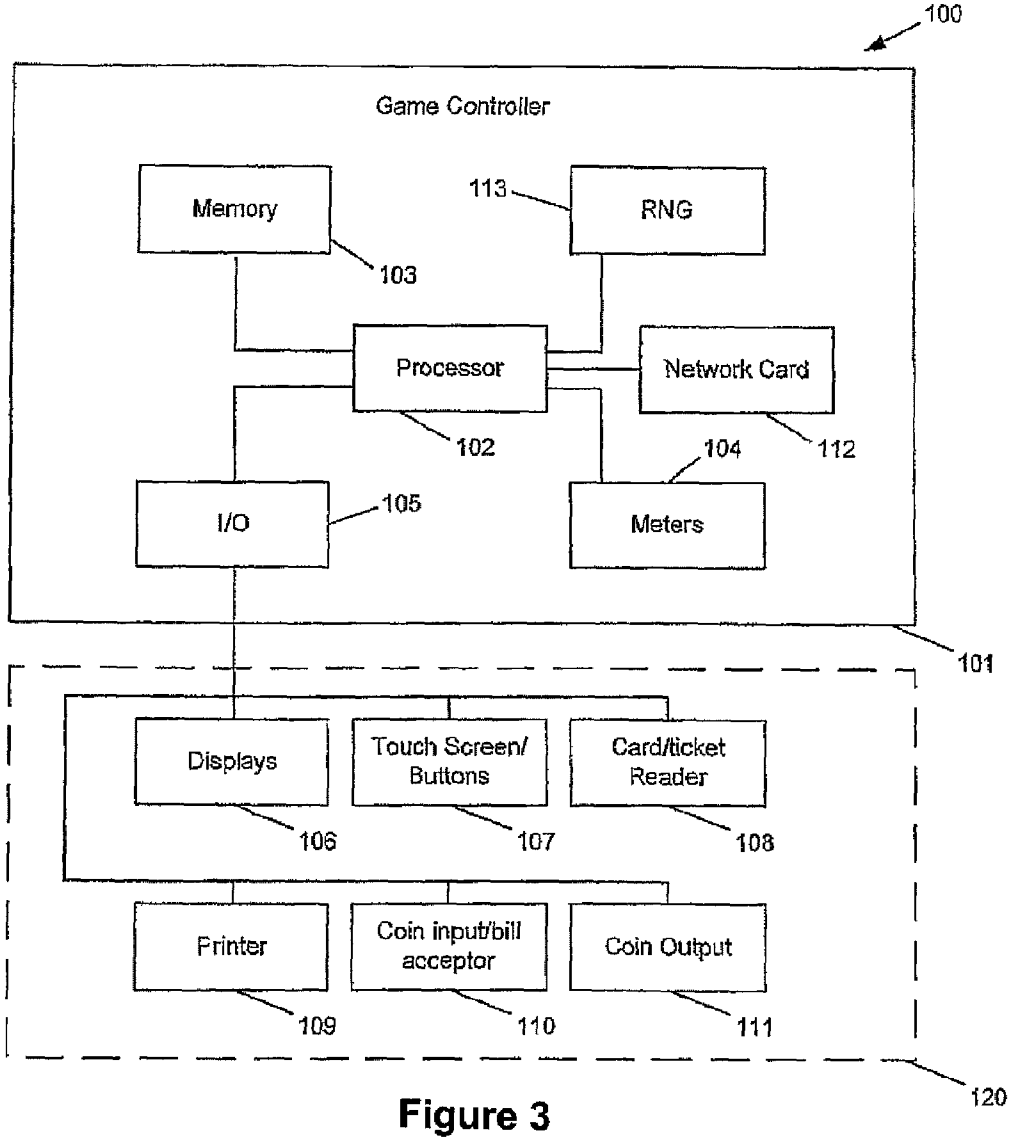
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
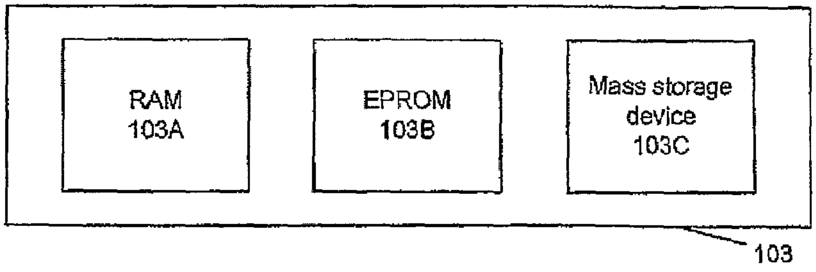
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
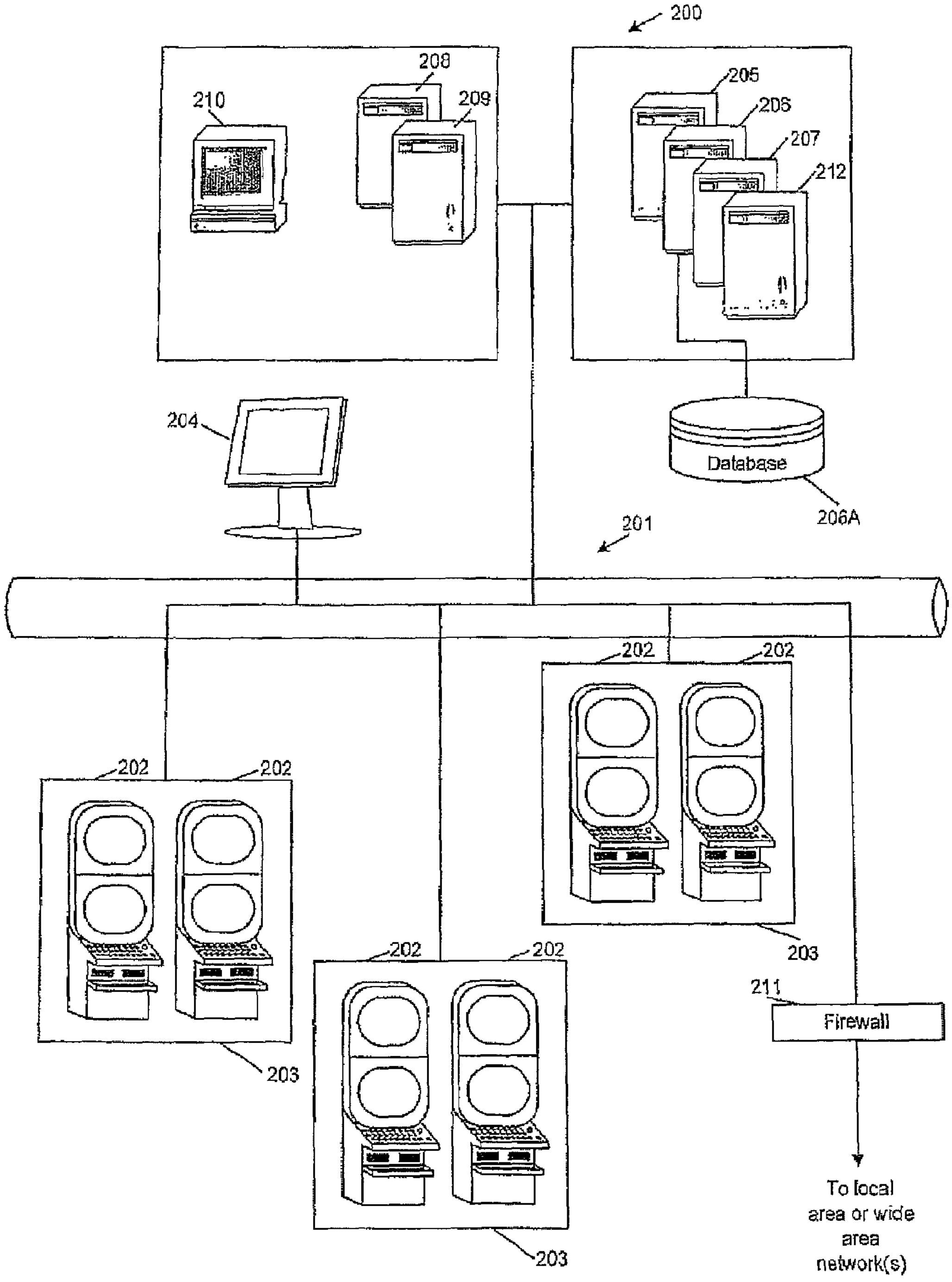
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the guidelines and/or rules for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games based on the terminals.

Figure 6:
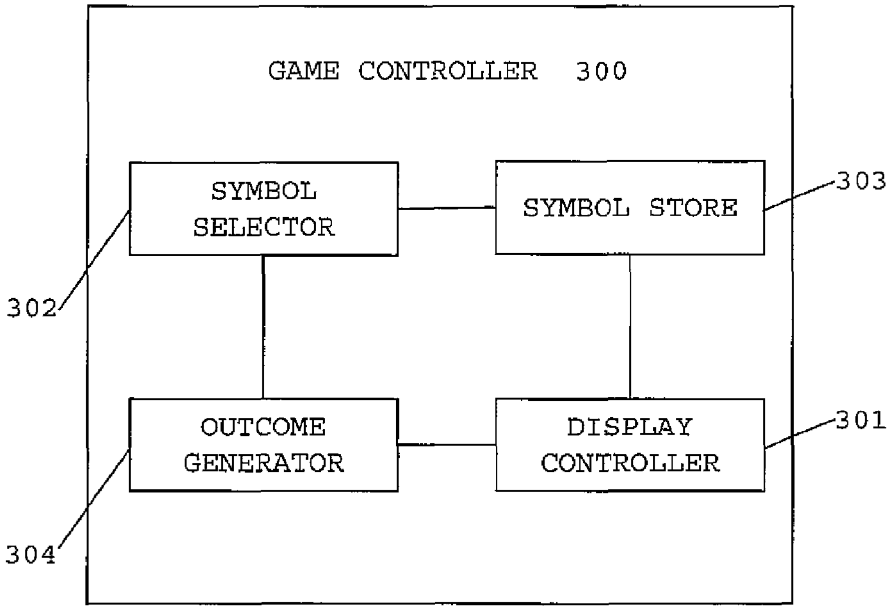
FIG. 6 is a schematic diagram of functional components of a gaming system in accordance with an embodiment of the present invention.

Referring to FIG. 6, the functionality of embodiments of the present invention may be implemented by a game controller having the functional components illustrated. In this embodiment, the functional components are implemented utilising a processor and memory, (such as processor 102 and memory 103 in FIG. 3, or processor 62 and memory 64 in FIG. 1, for the game server 205 in FIG. 5) and associated programming. Other implementations are envisaged. For example the functional blocks of FIG. 6 may be implemented in hardware as separate units, or a combination of hardware and software as separate units. Any practical implementation of these functional units may be employed.

In this embodiment, the game controller 300 is arranged to control the gaming system to play a base game which includes selection of a plurality of symbols from a set of symbols. The base game is implemented as a "reel" game. The game controller 300 includes a display controller 301 which is arranged to control the display (reference numerals 54, 14, 106, 204 of previous figures) to emulate a representation of reels bearing symbols. Alternatively, the display may include a stepper motor and physical reels bearing the symbols.

The game controller 300 includes a symbol selector 302 which is arranged to select a plurality of symbols from a set of symbols available in a symbol store 303. An outcome generator 304 is arranged to determine an outcome of the base game. In this embodiment, the outcome of the base game depends on the selected symbols and may include a win outcome, loss outcome, trigger outcome or a feature outcome. Outcomes may be determined on the basis of symbols appearing in one or more horizontal lines, diagonal lines, or any other pre-determined combinations.

Figure 7:
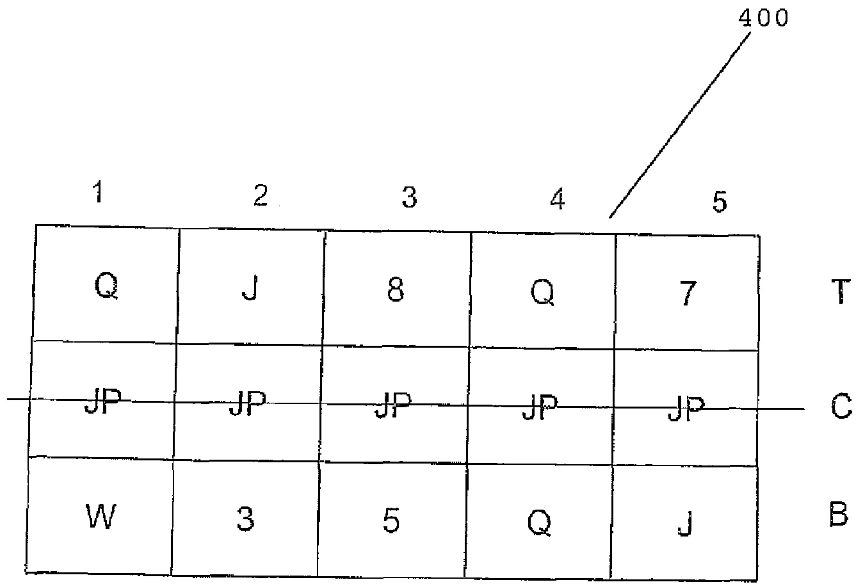
FIGS. 7 through 9 are representations of example displays generated by a gaming system in accordance with an embodiment of the present invention.

FIG. 7 shows a schematic representation of a gaming machine display 400 which, in the example shown, has five reels (numbered "1" to "5"). The display window 400 shows three reel positions high when the reels have stopped/the symbols have been selected. The reel positions are designated Bottom ("B"), Centre ("C") and Top ("T"). This is a typical reel-type display for a gaming machine. It will be appreciated that in other embodiments the number of reel positions may be more or less than in display 400. Also the number of reels may be more or less than in the display 400.

The reels may be virtual reels, generated as a video display from the selected symbols, actual mechanical reels carrying the symbols and driven by a stepper motor, or any other reel arrangement or emulation. In the case of actual physical reels, the game controller drives a stepper motor to randomly select the symbols appearing in the display 400.

The game outcome is determined by the outcome generator 304 based on combinations of symbols selected and appearing in the display 400. The symbols may be any symbols. As will be appreciated, many different types of symbols are used in gaming systems. A set of symbols may include standard symbols and function symbols. For example, standard symbols may resemble fruit such as apples, pears and bananas with a win outcome being determined when a predetermined number of the same fruit appear on a display in the same line, scattered, and so on. The function associated with a function symbol may be a "wild" function wherein display of the function symbol is treated during consideration of the game outcome as any of the standard symbols. Other functions may include scatter functions, multiplier functions, repeat win functions, jackpot functions and feature commencement functions.

In the example shown in FIG. 7, the symbols are representations of cards, by which a poker-type card game may be played. In this example, a winning poker hand appearing on the C line may cause the outcome generator to determine that a Win has occurred and that an appropriate prize may be awarded. For example, five of a kind (e.g. 5 jacks "J". 5 tens "10" etc on the C line may result in a win. A straight or a straight flush or any other poker combination on the C line may also result in a win.

In addition to card symbols, the symbols also include a Wild "W" symbol which is a function symbol which, when it occurs on the C line may be considered by the outcome generator 304 to operate as any symbol which may assist in a win. Symbols also include a Jackpot ("JP") symbol which when five JP symbols appear on the C line may result in a jackpot win. The jackpot may be a progressive jackpot, a linked progressive jackpot, or any other type of jackpot.

The diagram shown in FIG. 7 is schematic only and it will be appreciated that embodiments of the invention may implement the symbols graphically, with fancy artwork or in any other appropriate manner.

In one of the base game outcomes, five JP symbols appearing on the C line may result in a jackpot win. In this embodiment, a number of different jackpot wins may be offered i.e. "Grand", "Major", "Minor" and "Mini" different jackpot prizes are awarded to the player depending on which type of jackpot is won. To determine the type of jackpot won, a feature game is generated as a result of the base game selecting five JP symbols on the C line.

The feature game in this embodiment includes a first game and a second game, and in this example the second game is represented as a wheel game. The first game is represented as a typical reel game. Operation of the first and second games will now be described with reference to FIGS. 8, 9 and 10.

Figure 8:
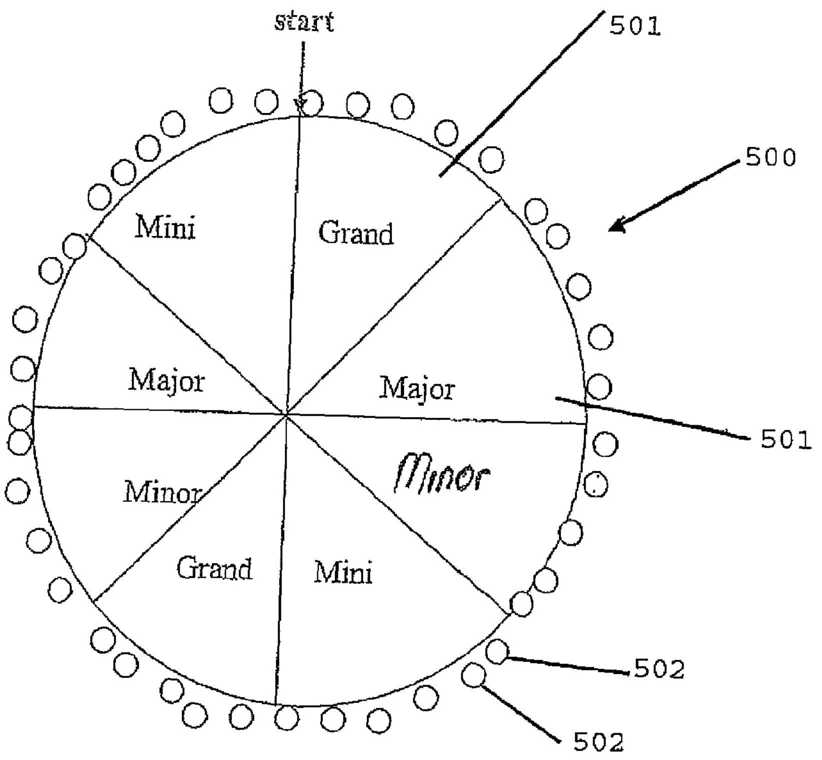

Referring to FIG. 8, the display controller 301 generates a display including a selector 500 having a plurality of outcome indicating parts 501 and an indicator 502. In this embodiment, the outcome indicating parts 501 form segments of a wheel (such that the selector 500 is represented as a wheel) and the indicator 502 is formed by a plurality of chaser lights 502 spaced around the circumference of the wheel 500. In this example, each segment 501 of the wheel 500 represents a quantum of jackpot win (i.e. Grand, Major, etc). In operation, illumination of the chaser lights 502 is generated in sequence around the circumference of the wheel 500. At the end of the game, the segment which the illuminated chaser light indicates determines the type of jackpot to be awarded to the player.

In this embodiment, the display is generated as a virtual video display emulating a wheel with chaser lights. For example, it may be displayed on display 54, 14, 106 of the previously described figures. In one embodiment, it may be emulated by a top box 26 display of the stand alone machine 52.

Figure 9:
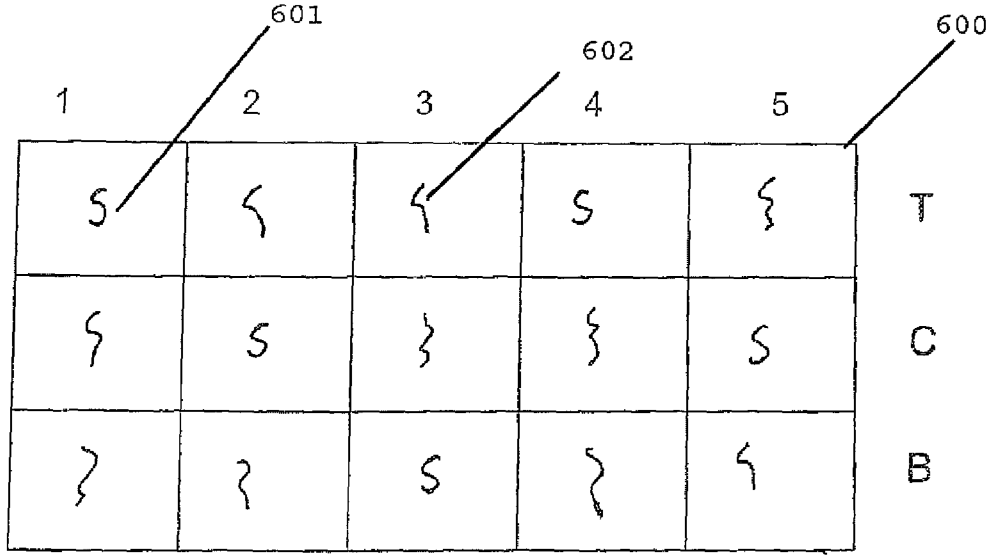

In this embodiment, motion of the indicator 502 relative to the segments 501 is dependent on operation of a first game, which is implemented as a reel game a representation of which is illustrated in FIG. 9. In this embodiment, the display controller 301 controls the display to replace the reel representation 400 of FIG. 7 of the base game with a new reel representation 600 for the first game. The new reel representation is generated as a video display of virtual reels three rows high and five columns wide. The symbols used during play of the first game, in this embodiment, are different from the symbols used in the base game. In an alternative embodiment, they may be the same symbols. As with the base game, for the first game, the symbol selector 302 makes selections from the symbol store 303 for the symbols for the first game. Symbols include an "S" function symbol 601, which may in this embodiment be in the form of a representation of a shark (it will be appreciated that the special function symbol may be in any form and is not limited to a representation of a shark) and other symbols 602, which may be any other symbols.

The display of the first game need not replace the display of the base game. In other embodiments, the first game may be displayed on a separate display with the base game remaining displayed. With base games implemented by mechanical reels and a stepper motor, the first game may be implemented by a separate video display, or by a separate stepper reel display which only operates when the first game is played. The first game display may be implemented or emulated in any practical way.

An example of operation of the first and second games will now be described.

The game controller 300 operates via the display controller 301 to cause the display to emulate spinning of reels 600 of FIG. 9. The symbol selector 302 operates to select the symbols to appear on the reels. When an "S" is spun up on a reel, then that reel is held for the remainder of the play of the first game. Game play proceeds by another spin of the first game. Another spin occurs with the remainder of the reels and so on until Sharks appear on all of the reels and all the reels are held. For every spin of the reels 600, the chaser light indicator 502 moves a pre-determined number of positions around the wheel (in this case one position per each spin). The jackpot award is represented by the segment that the chaser light 502 finishes on at the completion of the first game.

In the example illustrated in FIGS. 8 and 9, it has taken twelve spins of the reels 600 for Sharks to appear on every reel and the chaser light has moved around twelve positions from the start position to finish in a "minor" segment. In this case the minor jackpot is awarded. If it had taken only ten spins to spin up Sharks on all the reels, then a Major jackpot would have been awarded.

An advantage of this embodiment is that the probability of a particular outcome occurring in the second game (the wheel game) is not related to the size of the segment. The probability of stopping on the segment is determined by the number of free spins of the first game which it takes to have a shark appear on each reel. The outcome of the second game is therefore dependent on the outcome of the first game.

The wheel feature also provides visual excitement for the player, particularly, as in achieving the final outcome, in this case the indicator first passes through the Grand and then Major prizes. Anticipation and excitement of the player is therefore maintained.

In this embodiment, the chaser light moves for each reel spin that occurs so that movement of the indicator 502 occurs while the first game is being played. This increases the anticipation and entertainment.

Figure 10:
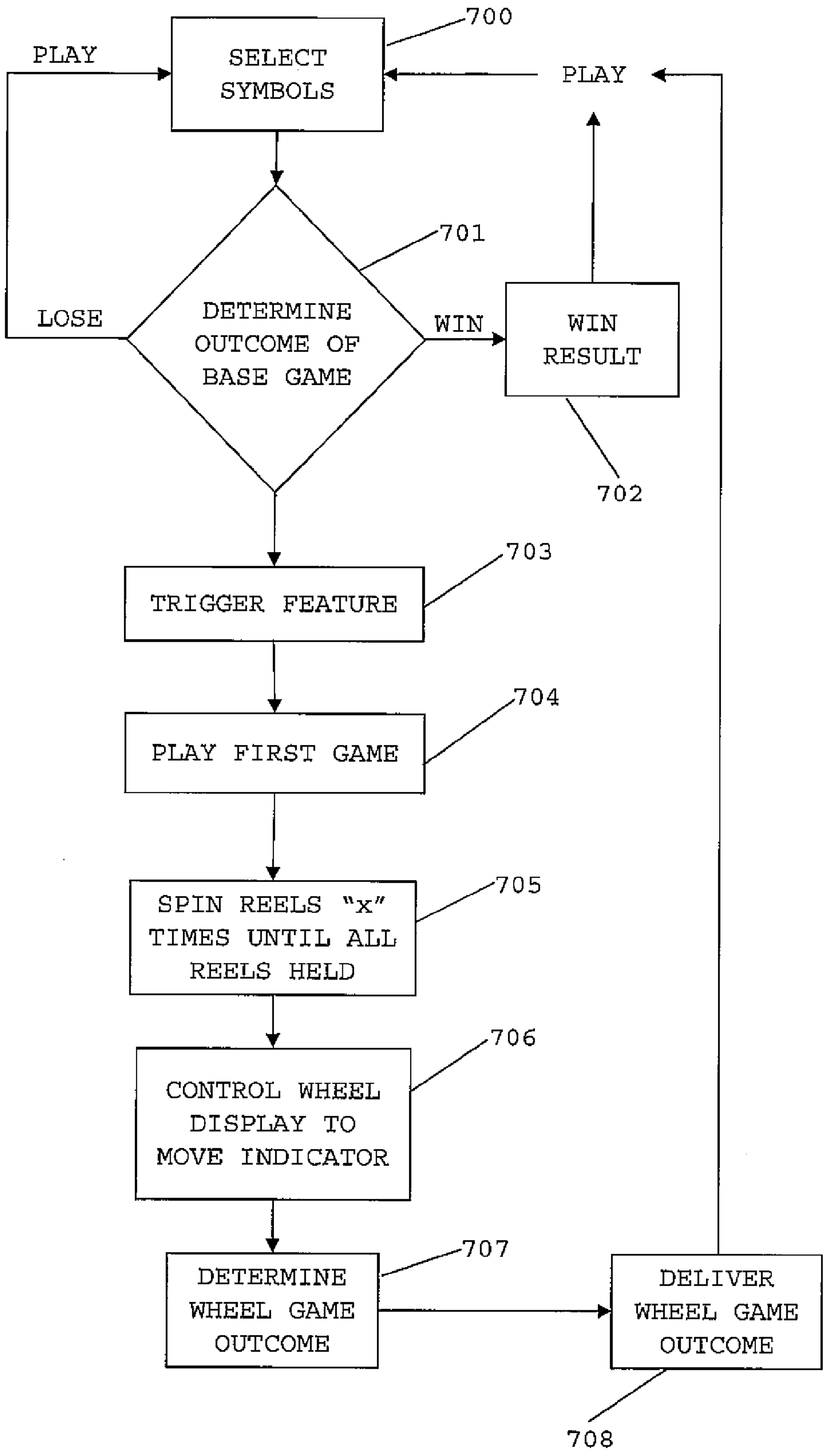
FIG. 10 is a flow diagram illustrating operation of a gaming system in accordance with an embodiment of the present invention.

The game playing process of this embodiment will now be summarized with reference to FIG. 10.

At 700, the base game is played by selection of symbols from the symbol store 303 by the symbol selector 302. At 701 an outcome of the base game is determined. Depending on the combination of symbols this may be a "Win", in which case a Win Result (702) is determined for the player. The player may then have the choice to play again. The result may be a "Lose" Result, in which case the player will again have the choice whether to play again. In some cases (such as in the example described above where a jackpot is to be won) a feature may be triggered (step 703) to play the first and second games.

The first game is played (704) by spinning the reels an "X" number of times (705) until all the reels are held. At the same time (706) the indicator (502) is moved around the wheel display in dependence on the number of reel spins ("X"). At 707, at the end of play of the first game and second game the wheel game outcome is determined and is delivered at 708. The player then may subsequently decide to play the base game again.

In the above described embodiment, relative motion of the indicator to the outcome indicating part depends on the number of reel spins required to bring up a predetermined symbol on each reel (in this case a "S" symbol) and therefore hold all the reels. In an alternative embodiment, motion of the indicator does not depend on the number of reel spins required to complete the first game. In this alternative embodiment, a fixed number of spins is awarded for play of the first game. The fixed number may be one or more spins (it will usually be between 8 and 14). For every special symbol "S" that appears on the reels during the fixed number of spins, the indicator moves a predetermined number of positions, for example one position per "S" symbol. Again, the outcome indicating part that the indicator indicates at the end of the first game determines the prize to be awarded. In this embodiment, the motion of the indicator is dependent on the number of S's spun up during the spins of the first game.

In the above embodiment, the outcome indicating part moves one position for each reel spin or each special symbol. In other embodiments, the indicator may move more than one position for each reel spin or each special symbol. It may move any predetermined number of positions.

There are many other alternatives by which the first game may govern relative motion of the indicator and the outcome indicating parts of the second game. For example, motion of the indicator may depend on a particular symbol combination being brought up during one or more free spins of the reels in the first game. Any other practical way of the second game depending on the first game may be utilised.

In the above described embodiment, the first game is a reel game which utilises different symbols from those used in the base game. In an alternative embodiment, the same symbols may be used, so that the reels for the base game and the first game are the same. In this embodiment, one of the symbols of the base game may be designated a "special" symbol for the first game.

In the above described embodiments, the base game and first game are emulated as reels or implemented as actual reels. In an alternative embodiment, the display may not emulate reels but merely show the selected symbols in a non-reel format e.g. presenting them as emulated playing cards, or other graphical representations. In this embodiment, each selection of a set of symbols is equivalent to one "spin" of the reels.

The first game and base game need not necessarily be a game based on symbol selection, but could be any other type of game.

In the above described embodiment, the first game and second game are generated as a feature of a base game. In alternative embodiments, the first game and second game may stand alone and may not be associated with any base game. In an embodiment, the first game may be the base game.

In the above-described embodiment the second game determines the size of a jackpot to be awarded to a player. The invention is not limited to this. Any type of prize may be associated with the second game. For example, the outcome indicating parts of the second game could be each associated with a different multiplier of a base prize, or could award a further feature game. Many alternative prizes may be awarded in different embodiments.

In the above embodiments, where a base game triggers the first game and second game as a feature, the trigger condition is a line of JP symbols. It will be appreciated that any trigger condition may be determined to instigate a feature game including a first game and a second game. Other combinations of symbols may be used to trigger the feature game, for example. Multiple trigger conditions may exist. A trigger condition may be based on a measure of time, but particular amount of waiting activity on the machine, based on player tracking information or may be a random event. A trigger condition may be when a special bet is placed.

In the embodiment described above, the wheel has a "start" position which is at 12 o'clock as illustrated in FIG. 8. The invention is not limited to this particular start position. In alternative embodiments, the wheel indicator may start anywhere. In an embodiment, it may start where is last finished. In another embodiment, it may start at a random position.

In the above described embodiments, the wheel feature is emulation of a wheel on a video display. In an alternative embodiment, the wheel display may include a mechanical wheel and indicator or electro mechanical wheel and indicator. Embodiments of the invention may utilise any practical implementation of a wheel feature.

In the embodiment described with reference to FIG. 8, the indicator 502 includes a plurality of chaser lights which select one or more of the outcome indicating parts 501. The indicator may take different forms from a plurality of distinct chaser lights. For example, the indicator may be an arrow or a type of indicator that travels around the periphery of the wheel in continuous or small steps. Alternatively the indicator may take the form of lighting up one or more of the outcome indicating parts. In yet a further embodiment, the indicator may be an arrow or other stationary marker and the segments may move relative to the indicator e.g. they may rotate in dependence on the first game.

In the above embodiments, the wheel features is a traditional circular wheel, with the plurality of outcome indicating parts being segments of the wheel. In alternative embodiments, the wheel feature may be generally rectangular, triangular, or polygonal in overall shape. In an alternative embodiment, the feature may not be a wheel at all, and could be, for example, a series of adjacent segments with an indicator moving between the segments.

In the above embodiments, where the base game and first game are reel games the reels display five rows and three columns. The invention is not limited to this arrangement. There may be any number of rows and columns for the base reel game and/or the first reel game.

In the Claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

It will be appreciated by persons skilled in the art that numerous variations and/or modifications may be made to the invention as shown in the specific embodiments and/or aspects without departing from the spirit or scope of the invention as broadly described. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A gaming system, comprising a game controller arranged to control operation of a base game, a first game and a second game, and a display arranged to display respective representations of the base game, the first game and the second game, wherein the representations of the base game and the first comprise a plurality of reels to respectively:

a) select a plurality of base symbols from a base symbol set in the base game; and b) select a plurality of first symbols from a first symbol set in the first game;

the representations of the second game comprising a selector having a plurality of outcome indicating parts and an indicator, the game controller being arranged to:

determine whether a trigger event occurs during play of the base game, and in response to said determination, replace the base symbol set of the base game with the first symbol set of the first game, wherein the base symbol set and the first symbol set are comprised of different symbols and wherein the first symbol set comprises at least one function symbol;

facilitate operation of the first game by selecting a plurality of first symbols from the first symbol set for a number of spins of the plurality of reels until the at least one function symbol is selected for display on the plurality of reels;

determine a second game outcome for the second game based at least in part on the number of spins of the plurality of reels of the first game to select the at least one function symbol; and control the indicator to indicate the outcome indicating part associated with the second game outcome.

2. A gaming system in accordance with claim 1, wherein the probability of a particular second game outcome occurring is dependent on operation of the first game.

3. A gaming system in accordance with claim 1, the game controller being arranged to determine a first game outcome for the first game, the second game outcome being dependent on the first game outcome.

4. A gaming system in accordance with claim 1, the game controller being arranged to control the display such that the indicator and outcome indicating parts move relative to each other, the motion being dependent on operation of the first game.

5. A gaming system in accordance with claim 4, where the motion occurs as the first game is played.

6. A gaming system in accordance with claim 4, wherein the second game is a wheel game, and the plurality of outcome indicating parts together represent a wheel.

7. A gaming system in accordance with claim 1, the game controller comprising a symbol selector arranged to select a plurality of symbols from a set of symbols for play of the first game, the outcome of the second game depending on the symbol selection for the first game.

8. A gaming system in accordance with claim 7, wherein the set of symbols comprise a pre-determined symbol, and where the outcome of the second game depends on selection of the pre-determined symbol.

9. A gaming system in accordance with claim 8, wherein the game controller is arranged to control the display to move the indicator relative to the outcome indicating parts for every pre-determined symbol that is selected until the first game is complete, the outcome indicating part that is indicated at completion of the first game representing the second game outcome, whereby the second game outcome depends on the number of the pre-determined symbols selected during the first game.

10. A gaming system in accordance with claim 1, wherein the display comprises one or more spinning reels or representations of spinning reels, and when the first game is played by spinning the one or more reels, the outcome of the second game depending on the number of reel spins of the one or more reels occurring during the first game.

11. A gaming system in accordance with claim 10, wherein the game controller is arranged to control the display to move the indicator relative to the outcome indicating parts for every pre-determined number of spins of the one or more reels occurring until the first game is complete, the outcome indicating part that is indicated at the completion of the first game representing the second game outcome.

12. A gaming system in accordance with claim 1, the game controller being arranged to control play of a further game and determine an outcome of the further game, the first game and second game being a feature game generated as an outcome of the further game.

13. A gaming system in accordance with claim 1, wherein at least one outcome of the second game is a jackpot win.

14. A gaming system in accordance with claim 1, comprising a stand alone gaming machine mounting the game controller and display.

15. A gaming system in accordance with claim 1, comprising a gaming server and gaming client implementing the game controller and display.

16. A method of gaming via a game controller arranged to control operation of a base game, a first game and a second game, and a display arranged to display respective representations of the base game, the first game and the second game, wherein the representations of the base game and the first comprise a plurality of reels for respectively:

a) selecting a plurality of base symbols from a base symbol set in the base game; and b) selecting a plurality of first symbols from a first symbol set in the first game, the method comprising:

determining whether a trigger event occurs during play of the base game, and in response to said determination, replace the base symbol set of the base game with the first symbol set of the first game, wherein the base symbol set and the first symbol set are comprised of different symbols and wherein the first symbol set comprises at least one function symbol;

facilitating play of the base game, the first game and the second game, wherein facilitating play comprises facilitating operation of the first game by selecting a plurality of first symbols from the first symbol set for a number of spins of the plurality of reels until the at least one function symbol is selected for display on the plurality of reels;

displaying representations of play of the second game, the representations comprising a selector having a plurality of outcome indicating parts and an indicator;

determining, using a processor, a second game outcome for the second game based at least in part on the number of spins of the plurality of reels of the first game to select the at least one function symbol; and controlling, using a processor, the indicator to indicate the outcome indicating part associated with the second game outcome.

17. A method in accordance with claim 16, wherein the probability of a particular second game outcome occurring is dependent on play of the first game.

18. A method in accordance with claim 16, wherein facilitating play of the first game comprises determining a first game outcome for the first game, and wherein the second game outcome is dependent on the first game outcome.

19. A method in accordance with claim 16, wherein facilitating play of the second game comprises moving the indicator and outcome indicating parts relative to each other, the motion being dependent on play of the first game.

20. A method in accordance with claim 19, wherein facilitating play of the second game comprises moving the indicator and outcome indicating parts relative to each other as the first game is played.

21. A method in accordance with claim 19, wherein the second game is a wheel game, and the plurality of outcome indicating parts together represent a wheel.

22. A method in accordance with claim 16, wherein facilitating play of the first game comprises the step of selecting a plurality of symbols from a set of symbols, and wherein the outcome of the second game depends on the symbol selection for the first game.

23. A method in accordance with claim 22, wherein the set of symbols comprise a pre-determined symbol, and where the outcome of the second game depends on selection of the pre-determined symbol during the first game.

24. A method in accordance with claim 23, wherein facilitating play of the second game comprises moving the indicator relative to the outcome indicating parts for every pre-determined symbol that is selected, until the first game is complete, the outcome indicating part which is indicated at completion of the first game representing the second game outcome, whereby the second game outcome depends on the number of the pre-determined symbols selected during the first game.

25. A method in accordance with claim 16, wherein displaying representations of play of the first game comprises displaying one or more spinning reels or virtual spinning reels, and wherein facilitating play of the first game comprises spinning the one or more reels, and wherein the outcome of the second game depends on the number of reel spins of the one or more reels occurring during the first game.

26. A method in accordance with claim 25, wherein facilitating play of the second game comprises moving the indicator relative to the outcome indicating parts for every predetermined number of spins of the one or more reels occurring until the first game is complete, the outcome indicating part which is indicated at the completion of the first game representing the second game outcome.

27. A method in accordance with claim 16, further comprising facilitating play of a further game and determining an outcome of the further game, the first game and second game being a feature game generated as an outcome of the further game.

28. A method in accordance with claim 16, wherein an outcome of the second game is a jackpot win.

29. A tangible computer readable storage medium including a computer program comprising instructions for controlling a computer to implement a gaming system, the gaming system comprising a game controller arranged to control operation of a base game, a first game and a second game, and a display arranged to display respective representations of the base game, the first game and the second game, wherein the representations of the base game and the first comprise a plurality of reels to respectively:

a) select a plurality of base symbols from a base symbol set in the base game; and b) select a plurality of first symbols from a first symbol set in the first game;

the representations of the second game comprising a selector having a plurality of outcome indicating parts and an indicator, the game controller being arranged to:

determine whether a trigger event occurs during play of the base game, and in response to said determination, replace the base symbol set of the base game with the first symbol set of the first game, wherein the base symbol set and the first symbol set are comprised of different symbols and wherein the first symbol set comprises at least one function symbol;

facilitate operation of the first game by selecting a plurality of first symbols from the first symbol set for a number of spins of the plurality of reels until the at least one function symbol is selected for display on the plurality of reels;

determine a second game outcome for the second game based at least in part on the number of spins of the plurality of reels of the first game to select the at least one function symbol; and control the indicator to indicate the outcome indicating part associated with the second game outcome.

30. A game controller for a gaming system, the game controller being arranged to control operation of a base game, a first game and a second game, and a display arranged to display respective representations of the base game, the first game and the second game, wherein the representations of the base game and the first comprise a plurality of reels to respectively:

a) select a plurality of base symbols from a base symbol set in the base game; and b) select a plurality of first symbols from a first symbol set in the first game;

the representations of the second game comprising a selector having a plurality of outcome indicating parts and an indicator, the game controller being arranged to:

determine whether a trigger event occurs during play of the base game, and in response to said determination, replace the base symbol set of the base game with the first symbol set of the first game, wherein the base symbol set and the first symbol set are comprised of different symbols and wherein the first symbol set comprises at least one function symbol facilitate operation of the first game by selecting a plurality of first symbols from the first symbol set for a number of spins of the plurality of reels until the at least one function symbol is selected for display on the plurality of reels;

determine a second game outcome for the second game based at least in part on the number of spins of the plurality of reels of the first game to select the at least one function symbol; and control the indicator to indicate the outcome indicating part associated with the second game outcome.

31. A game controller in accordance with claim 30, wherein the probability of a particular second game outcome occurring is dependent on operation of the first game.

32. A game controller in accordance with claim 30, being arranged to determine a first game outcome for the first game, the second game outcome being dependent on the first game outcome.

33. A game controller in accordance with claim 30, being arranged to control the display such that the indicator and outcome indicating parts move relative to each other, the motion being dependent on operation of the first game.

34. A game controller in accordance with claim 33, where the motion occurs as the first game is played.

35. A game controller in accordance with claim 33, wherein the second game is a wheel game, and the plurality of outcome indicating parts together represent a wheel.

36. A game controller in accordance with claim 30, comprising a symbol selector arranged to select a plurality of symbols from a set of symbols for play of the first game, the outcome of the second game depending on the symbol selection for the first game.

37. A game controller in accordance with claim 36, wherein the set of symbols comprise a predetermined symbol, and where the outcome of the second game depends on selection of the pre-determined symbol.

38. A game controller in accordance with claim 37, arranged to control the display to move the indicator relative to the outcome indicating parts for every pre-determined symbol that is selected until the first game is complete, the outcome indicating part that is indicated at completion of the first game representing the second game outcome, whereby the second game outcome depends on the number of the pre-determined symbols selected during the first game.

39. A game controller in accordance with claim 30, wherein the display comprises one or more spinning reels or representations of spinning reels, and when the first game is played by spinning the one or more reels, the outcome of the second game depends on the number of reel spins of the one or more reels occurring during the first game.

40. A game controller in accordance with claim 39, arranged to control the display to move the indicator relative to the outcome indicating parts for every pre-determined number of spins of the one or more reels occurring until the first game is complete, the outcome indicating part that is indicated at the completion of the first game representing the second game outcome.

41. A game controller in accordance with claim 30, being arranged to control play of a further game and determine an outcome of the further game, the first game and second game being a feature game generated as an outcome of the further game.

42. A game controller in accordance with claim 30, wherein at least one outcome of the second game is a jackpot win.

43. A tangible computer readable storage medium including a computer program comprising instructions for controlling a computer to implement a game controller for a gaming system, the game controller being arranged to control operation of a base game, a first game and a second game, and control operation of a display to display respective representations of the base game, the first game and the second game, wherein the representations of the base game and the first comprise a plurality of reels to respectively:

a) select a plurality of base symbols from a base symbol set in the base game; and b) select a plurality of first symbols from a first symbol set in the first game;

the representations of the second game comprising a selector having a plurality of outcome indicating parts and an indicator, the game controller being arranged to:

determine whether a trigger event occurs during play of the base game, and in response to said determination, replace the base symbol set of the base game with the first symbol set of the first game, wherein the base symbol set and the first symbol set are comprised of different symbols and wherein the first symbol set comprises at least one function symbol;

facilitate operation of the first game by selecting a plurality of first symbols from the first symbol set for a number of spins of the plurality of reels until the at least one function symbol is selected for display on the plurality of reels;

determine a second game outcome for the second game based at least in part on the number of spins of the plurality of reels of the first game to select the at least one function symbol; and control the indicator to indicate the outcome indicating part associated with the second game outcome.

* * * * *